Jan. 11, 1955 — A. B. STEINER — 2,699,135
APPARATUS FOR MARINE TRANSPORT OF KELP
Original Filed March 2, 1945
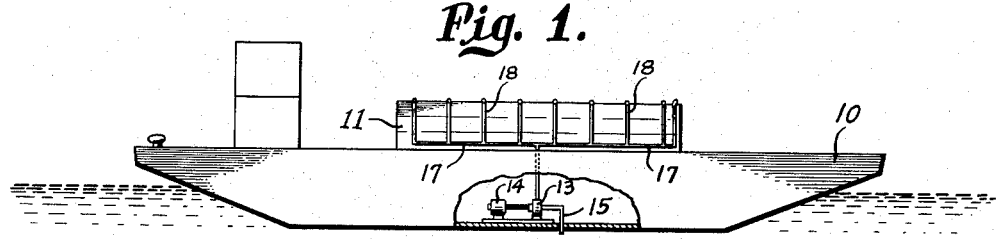
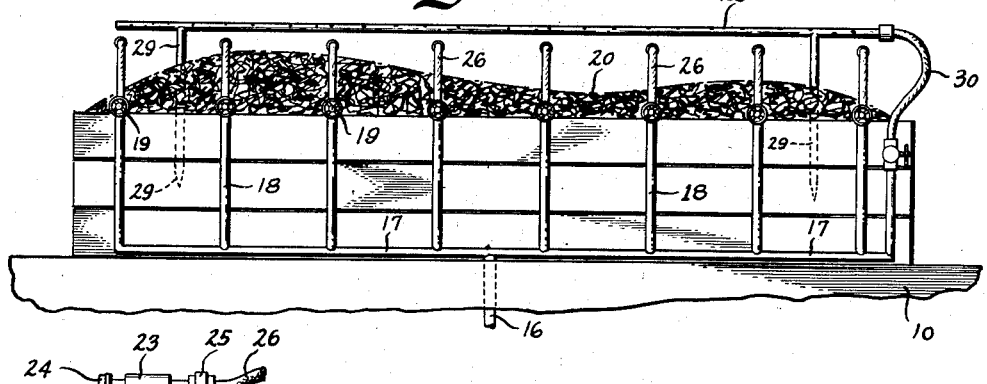
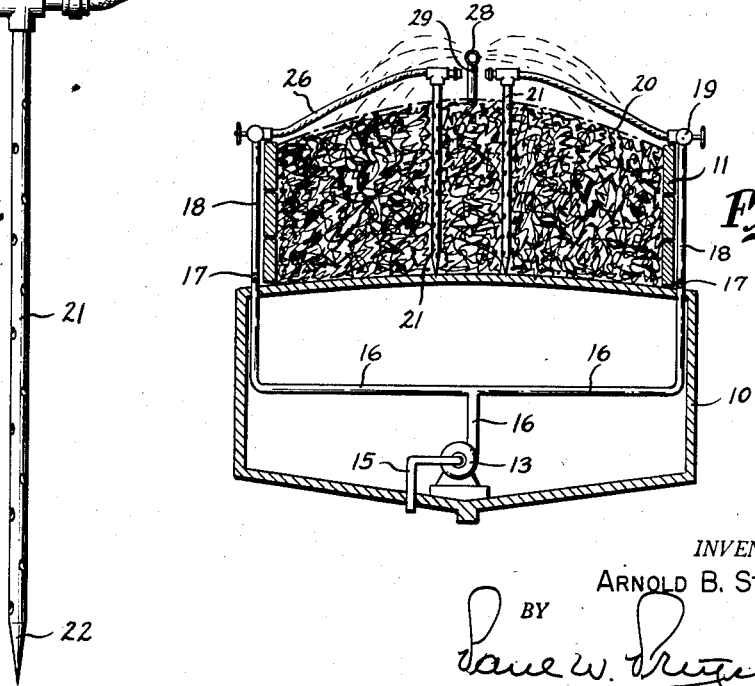
INVENTOR.
ARNOLD B. STEINER

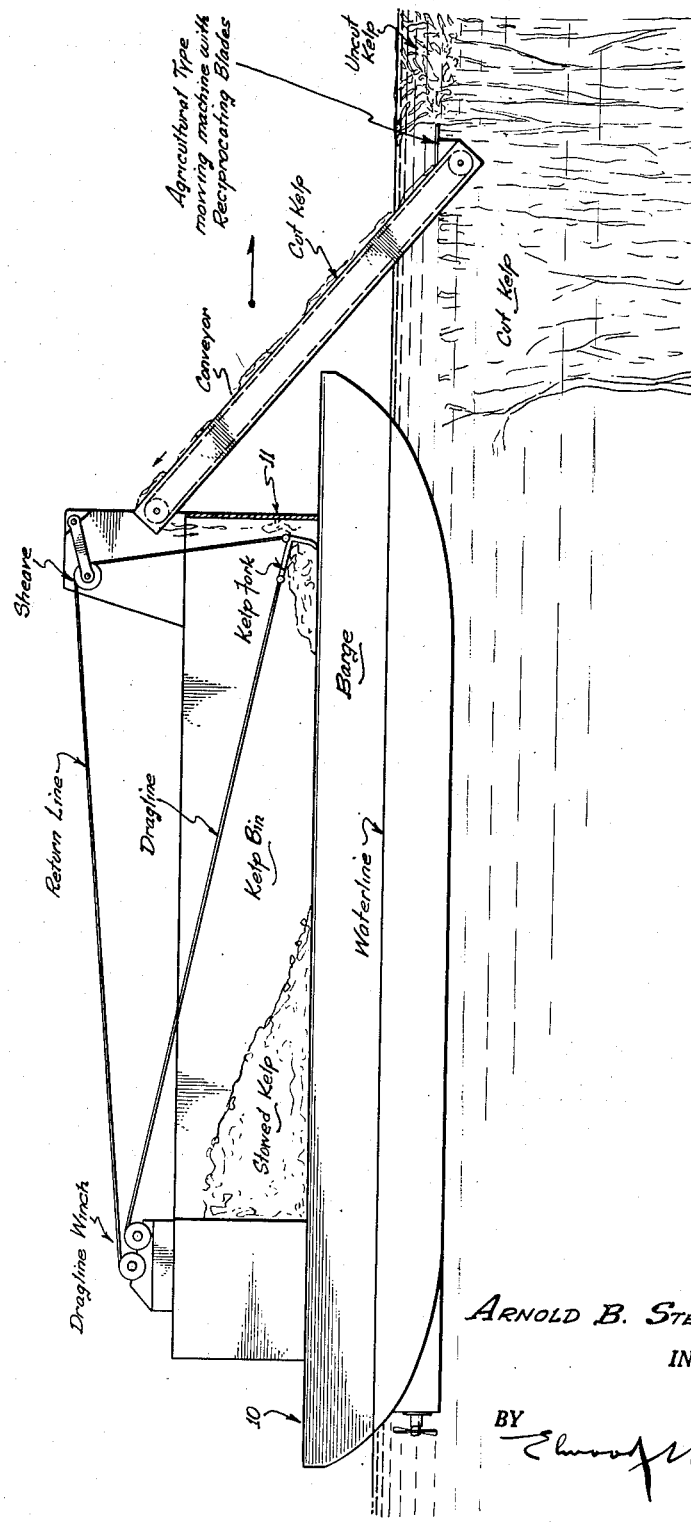

United States Patent Office 2,699,135
Patented Jan. 11, 1955

2,699,135

APPARATUS FOR MARINE TRANSPORT OF KELP

Arnold B. Steiner, La Jolla, Calif., assignor to Kelco Company, San Diego, Calif., a corporation of Delaware Original application March 2, 1945, Serial No. 580,515. Divided and this application August 24, 1948, Serial No. 45,830

11 Claims. (Cl. 114—.5)

This application is a division of my copending application Serial No. 580,515, filed March 2, 1945, and entitled "Manufacture of Alginic Products."

The present invention relates to a step in the manufacture of alginic acid and its salts by which the yield and the quality of the product are materially enhanced.

As is well known, alginic acid and its commercially useful salts are prepared from certain of the giant kelps which occur in profusion at various points along the western coast of the United States and elsewhere. While these growths are of general occurrence and may be found wherever the ocean bottom is of rock formation and the environment is suitable, certain localities appear to be particularly favorable to their development and the commercially important beds may be located at considerable distances from one another and from the processing plant. For example, on the South Pacific coast the principal sources of supply are adjacent respectively to San Diego and Santa Barbara, points separated by an ocean voyage of more than two hundred miles.

The prior art patents relating to the manufacture of algins (e. g., Stanford 349,760; Thornley and Walsh 1,814,981; Clark and Green 2,036,922; Green 2,036,934; and Gloahec and Herter 2,128,551) begin their disclosures with the kelp or seaweed at hand in the processing plant, and some of them even recite that their process steps may be applied indifferently to fresh or partially dried kelp or even to dried kelp (Stanford and Gloahec and Herter).

Those familiar with the subject are aware that the yield of alginic acid from a given kelp, and the viscosity (at constant concentration) of solutions of its water-soluble salts, may be varied over a wide range by varying the manipulation of the kelp in the manufacturing process. In large scale manufacture, therefore, every effort is made to select the optimum operating conditions and to maintain these conditions absolutely constant over long operating periods.

In spite of the most careful regulation of plant conditions and the maintenance of substantially complete uniformity, it has been noted that unexplained variations in both yield and quality of product will occur, these variations being of highly material extent, as will be shown.

I have discovered that at least considerable parts of these fluctuations are due to changes taking place in the kelp itself, between the time at which it is harvested and the time at which it enters the actual process of manufacture. I have also discovered that by keeping the harvested kelp drenched with ocean water from the point of harvesting until it is delivered into the processing plant, the hitherto unexplained variations in yield and quality of product are substantially or completely avoided.

In large scale operation, the kelp is harvested by a device similar to a grain harvester, the reciprocating blades being mounted in advance of a barge and being arranged to be submerged below the ocean surface. The barge being continuously advanced through the kelp bed, the kelp as cut is lifted by conveyors which deposit it in a large bin or bins mounted on the deck of the barge and arranged for drainage back into the ocean. A drag line is used for trimming the load as it accumulates on the forward end of the barge. In the past it has been customary to allow the load to drain freely, both while being loaded and while in transit.

The improvement over this practice consists in maintaining the kelp, preferably during the loading of the bin but in any case during the transit of the barge from the harvesting point to the plant, wetted in all of its parts with a constantly changed supply of ocean water.

The step first taken was to deliver an ample supply of ocean water onto the upper surface of the body of kelp, the water percolating through the mass and draining back into the ocean. This step produced some improvement in plant output and in quality of product, but it was found that by reason of the tendency of the kelp to pack, only a limited amount of water would pass through the bed, the excess flowing off the surface. It was also found that the quantity which did pass through followed channels of least resistance, with the result that parts of the load were protected from undesired changes while other parts were not.

The further step was then taken of introducing the water supply into the kelp mass at spaced points below the surface, in the general manner indicated in the attached drawings, in which Fig. 1 is an outline side elevation of an ocean going barge provided with a kelp bin;

Fig. 2 is a side elevation of the bin, illustrating a suggestive arrangement of water distributing pipes;

Fig. 3 is a cross section through the bin and the hull of the barge;

Fig. 4 is a detail of one of the "sticker" pipes indicated at 21 in Fig. 3; and

Fig. 5 is an enlarged diagrammatic side elevational view of the barge showing the equipment for cutting, conveying and stowing the kelp.

Referring to the drawings, the hull of the barge is indicated at 10 and a bin 11 is shown as mounted on the deck. The bottom of the bin is arched slightly, as at 12, and its side walls are of heavy timbers spaced sufficiently to allow water to drain freely while retaining the kelp.

Fig. 5 shows diagrammatically how the kelp is cut under water by mower mechanism and is lifted by conveyor for deposit in one end of the bin 11. Fig. 5 also shows how a fork is operated by a drag line to distribute the kelp in the bin.

A centrifugal or other pump 13 is mounted in the hull as may be convenient and is driven as by an electric motor 14. The pump draws in ocean water through suction pipe 15 and discharges it through a branched pipe 16—16 to two headers 17—17 running more or less the length of the bin. These headers feed a plurality of risers 18—18 located outside the bin and terminating above its upper edge, each riser being provided with a valve 19.

To produce adequate distribution of the water throughout the kelp it is necessary to introduce it near the longitudinal center line of the load and through numerous vertically spaced orifices arranged between the deck and the top of the load. As it is customary to crown the load considerably above the edge of the bin (as indicated by the dotted lines 20) and as a drag line is used to move the kelp from the forward to the after end of the bin, it is difficult to use fixed distributing pipes projected upwardly.

To overcome this difficulty I have devised the "sticker" pipes indicated at 21—21 and shown in detail in Fig. 4. These elements, which may be of about 1" galvanized pipe are provided at the lower end with a pointed shoe 22 which may be driven lightly into the wooden floor of the bin to hold the pipe in position when in use. The upper end of the pipe is provided with a T 23 which is plugged at one side as at 24 and carries on the other end of the run a union 25 for the attachment of a flexible hose 26 by which it is coupled to one of the risers 18. The length of the pipe is slightly in excess of the maximum depth of the load and it is provided with a spirally arranged line of perforations spaced say 8" apart and extending to 10" or 12" from each end. It is desirable to graduate the size of the perforations: for example, for a load ten to twelve feet deep the uppermost perforations may be of the order of $7/32"$ and the lowermost of the order of $12/32"$.

These pipes are put into place only after the load is completed and trimmed. At this time they are forced down through the kelp, using the T-head as a handle, into the wooden bottom of the bin, the hose connections are made and pumping is started. A satisfactory arrangement of the sticker pipes is in two lines parallel to and spaced perhaps three feet from the longitudinal center line of the load, the stickers being spaced about six feet apart in each line. With this arrangement it is found that the ocean water supplied by the pump percolates through all parts of the kelp bed below the immediate upper surface, thus keeping it wet and cool, the water draining out through the sides of the bin without adding greatly to the weight of the load. It would be possible to use a bin with tight sides and to introduce the water supply from below, allowing it to overflow the edge of the bin. This expedient, of course, materially reduces the pay load capacity of any given barge.

To care for the upper surface of the load, which may not be adequately protected by the water supply introduced below the surface, it is desirable to spray water over it, as by means of the longitudinally arranged, perforated spray pipe 28 taking its supply from the same or another pump. This pipe should parallel the center line of the bin and should be provided with numerous perforations so disposed as to cover the exposed surface as completely as possible. This pipe may be positioned after loading is completed by the provision of imperforate branch pipes 29—29 driven into the kelp mass, and connected to the water supply by a hose 30. I have found that a supply of from 3 to 4 gallons per minute per 100 cubic feet (1½ to 2 tons) affords ample protection. By providing longitudinally arranged spray pipes, similar to pipes 28, for attachment to pairs of risers 18—18 along the edges of the bin, it is possible to spray the kelp while the bin is being loaded.

It will be understood that the particular arrangements above described for distributing the water supply through and over the load are illustrative and preferred but are not essential. The purpose of the invention will be served by any arrangements of piping and distributors by which all parts of the kelp mass may be kept drenched with ocean water.

The above described drenching of the kelp with ocean water has various effects, all of which are beneficial.

A. It maintains the hydration of the kelp, prevents wilting and thus materially facilitates the milling operation which precedes chemical treatment in the plant.

B. It maintains the harvested kelp in its normal habitat, thus keeping it alive for a material time after harvesting and avoiding depreciation in color due to post-mortem changes.

C. It prevents fermentation and heating and the resultant depolymerization of the algin and thus increases the yield of alginic acid and the viscosity of solutions of water-soluble alginates prepared from the acid.

D. As the undesired changes incurred in the absence of the treatment vary in magnitude with transit and storage time and with atmospheric temperature and humidity, all uncontrollable factors, the substantial elimination of these changed by the treatment tends strongly to promote uniformity of plant yield, both in quantity and in quality.

E. By extending the time of treatment to include the period of plant storage prior to processing, it is made possible to store a sufficient supply of fresh kelp to keep the plant in operation during periods of storm or other causes preventing daily harvesting.

All of these benefits are obtained without the use of chemicals and at no cost other than for the small amount of power used in pumping water. The extension of the treatment time to cover plant storage is made possible by the fact that plants of this type are, almost of necessity, located on tide-water. The water from bays and inlets may be used for this purpose provided these bodies are in free communication with the ocean and are not subject to bacterial contamination.

The surprising extent to which this simple treatment is effective in the above respects is shown by the following comparisons. These figures are based in part on experience in a large commercial plant, in part on careful laboratory experimentation, as will be indicated.

A. *Acceleration of milling*

Based on plant runs through a hammer mill grinder, first on kelp which had been harvested for 72 hours and exposed to the air, second on kelp from the same source which had been harvested for the same length of time but had been kept drenched with ocean water.

In this experiment the throughput of the grinding plant was approximately doubled without any appreciable increase in power consumption.

B. *Improvement in color of product*

The alginates yielded in the 144 hour test described under "C" below were brought into 1% solution and the colors noted. The solution of ammonium alginate from the undrenched kelp was dark brown and muddy. The solution of ammonium alginate from the drenched kelp was clear and almost colorless, having a faint tinge of tan. The conditions under which these comparison samples were produced were identical in all respects.

C. *Improvement in yield*

Based on tests of kelp, 72 hours after harvesting, without and with ocean water drench, by a laboratory method yielding closely reproducible results. The range of yields from a number of parallel tests, in pounds alginic acid per ton of wet kelp (equal to about 240 pounds dry kelp) was:

```
                                                    Pounds
Yield per ton undrenched kelp_____ 35 to 40
Yield per ton drenched kelp_____ 50 to 55
```

C. *Improvement in viscosity*

The alginic acids obtained in the above and similar laboratory treatments were converted to the ammonium salt and the Woolwich viscosities of aqueous solutions of 1% concentration were determined. (Woolwich viscosity is the time in seconds required for a $\frac{1}{16}''$ grade A steel ball to fall 15 cm. through a solution of given concentration maintained at a temperature of 20° C.). In some cases, higher concentrations of the alginates from the undrenched kelps were prepared to match the viscosity of the alginates from the drenched kelps. These tests covered periods after harvesting of 24 hours, 72 hours and 144 hours respectively.

(a) 24 hour results:
```
Alginate from undrenched kelp_____ 1% vis. =  280 sec.
Alginate from drenched kelp_____ 1% vis. = 1800 sec.
```
(b) 72 hour results:
```
Alginate from undrenched kelp_____ 1% vis. =   35 sec.
Alginate from drenched kelp_____ 1% vis. = 1800 sec.
Concentration of alginates from undrenched
  kelp at_____ 1800 vis. = 2.1%
```
(c) 72 hour results (another kelp sample):
```
Alginate from undrenched kelp_____ 1% vis. =   98 sec.
Alginate from drenched kelp_____ 1% vis. =  920 sec.
Concentration of alginates from undrenched
  kelp at_____ 920 vis. = 1.75%
```
(d) 144 hour results:
```
Alginate from undrenched kelp_____ 1% vis. =    5 sec.
Alginate from drenched kelp_____ 1% vis. =  440 sec.
Concentration of alginates from undrenched
  kelp at_____ 440 vis. = 1.75%
```

As will be evident from the above figures, the effectiveness of the treatment is fully maintained for a three-day period but is somewhat reduced after six days. It will also be noted that the treatment approximately doubles the throughput of the grinding apparatus, avoids the very undesirable discoloration of the product, increases the yield of alginic acid by about forty per cent, and reduces the quantity of the water-soluble alginate required to produce a solution of given viscosity by about one-half.

This invention is applicable to the preservation of all algin-containing brown algae, class Phaeophyceae, primarily of the families Laminariaceae, Alariaceae, Lessoniaceae, Fucaceae, and Sargassaceae and the genera Laminaria, Egregria, Alaria, Nereocystis, Pelogophycus, Macrocystis, Fucus, and Sargassum.

I claim as my invention:

1. Apparatus for transporting and preserving algin-containing kelps, comprising: a bin mounted on an ocean-going barge, said bin having perforate side walls and a wooden bottom; means for filling said bin with freshly harvested kelp; means for creating a stream of ocean water under pressure and for discharging said stream into a pipe header; a plurality of perforate water distributing pipes each pointed at its lower end to be driven into said wooden bottom when forced down through the body of kelp retained in said bin, and a plurality of flexible hose connections each coupling one of said perforate pipes with a branch of said pipe header.

2. Apparatus for transporting and preserving freshly harvested, algin-containing kelps which consists essentially of: an ocean-going barge; an open top bin on said barge adapted to receive and accumulate kelp as harvested; a pump on said barge having an in-take for drawing a stream of ocean water from outside said barge; a conduit on said barge connected to said pump to convey said stream directly to the vicinity of said bin; means connected with said conduit for distributing the water of said stream throughout a body of kelp collected in said bin, and means on the barge for continuously returning to the ocean the water passing through said kelp body.

3. Structure as described in claim 2, in which said pump and said conduit convey said ocean water directly from the ocean to said distributing means so that the water reaches the kelp at substantially the same salinity and same temperature as the water in the ocean.

4. Structure as described in claim 2, in which said distributing means is arranged to be removed while said bin is being loaded with kelp and to be readily replaced when said loading is completed.

5. Structure as described in claim 4, further including means operable while said bin is being loaded for spraying the upper surface of said kelp body with ocean water received from said conduit, said spraying means being positioned on both sides of the longitudinal center line of the bin and being spaced from said center line to provide clearance for transportation of the kelp along a central longitudinal path during the loading of the bin.

6. Structure as described in claim 2, in which said returning means includes openings through the side walls of said bin, said openings extending substantially the length of said bin.

7. Apparatus for transporting and preserving freshly harvested, algin-containing kelps which consists essentially of: an ocean-going barge; an open-top bin on said barge adapted to receive and accumulate kelp as harvested, said bin having water outlets above the water-line of the barge for drainage of water from the bin into the ocean; means on the barge to pump water continuously directly from the ocean to the vicinity of the bin; and a plurality of elongated water-distributing means on the barge flexibly connected with said pump means for insertion substantially upright into the kelp in the bin to release the pumped water in multiple streams into the mass of the kelp.

8. Apparatus as set forth in claim 7 in which each of said water-distributing means comprises a tubular member with peripheral discharge apertures spaced longitudinally thereof.

9. Apparatus as set forth in claim 8 in which said water-distributing means are apertured for release of the water at rates varying inversely with the depth of the bin.

10. Apparatus as set forth in claim 7 in which said pumping means delivers the water to said distributing means at less than the drainage capacity of said water outlets to prevent the water from backing up in said bin substantially above the level of said outlets.

11. Apparatus for transporting and preserving freshly harvested, algin-containing kelps which consists essentially of: an ocean-going barge; an open-top bin on said barge adapted to receive and accumulate kelp as harvested, said bin having water outlets above the water-line of the barge for drainage of water from the bin into the ocean; means on the barge to pump water continuously directly from the ocean to the vicinity of the bin; a spray pipe flexibly connected to said pump means for movement to and from a position extending above the kelp in the bin in a generally horizontal direction; and means carried by said spray pipe for engagement with the kelp to support the spray pipe in said position.

References Cited in the file of this patent

UNITED STATES PATENTS

| Number | Name | Date |
|---|---|---|
| 689,741 | McDougall | Dec. 24, 1901 |
| 1,009,223 | Cochrane | Nov. 21, 1911 |
| 1,196,138 | Muller | Aug. 29, 1916 |
| 1,222,324 | Richardson | Apr. 10, 1917 |
| 1,259,456 | Judson | Mar. 12, 1918 |
| 1,292,497 | McCain | Jan. 28, 1919 |
| 1,374,068 | Dunn | Apr. 15, 1921 |
| 1,495,473 | Fitzgerald | May 27, 1924 |
| 1,997,449 | Burkle | Apr. 9, 1935 |
| 2,196,643 | Reeh | Apr. 9, 1940 |

FOREIGN PATENTS

| Number | Country | Date |
|---|---|---|
| 30,343 | Netherlands | July 15, 1933 |